US011265077B1

(12) United States Patent
Liu et al.

(10) Patent No.: US 11,265,077 B1
(45) Date of Patent: Mar. 1, 2022

(54) METHOD FOR DEPLOYING TASK IN SATELLITE NETWORK

(71) Applicant: Dalian University, Dalian (CN)

(72) Inventors: Zhiguo Liu, Dalian (CN); Yunqi Li, Dalian (CN); Jianxin Feng, Dalian (CN); Chengsheng Pan, Dalian (CN)

(73) Assignee: Dalian University, Dalian (CN)

( * ) Notice: Subject to any disclaimer, the term of this patent is extended or adjusted under 35 U.S.C. 154(b) by 0 days.

(21) Appl. No.: 17/151,731

(22) Filed: Jan. 19, 2021

(30) Foreign Application Priority Data

Oct. 22, 2020 (CN) .......................... 202011138185.4

(51) Int. Cl.
| | | |
|---|---|---|
| *H04B 7/185* | (2006.01) | |
| *H04W 4/50* | (2018.01) | |
| *H04W 28/08* | (2009.01) | |

(52) U.S. Cl.
CPC ..... *H04B 7/18586* (2013.01); *H04B 7/18513* (2013.01); *H04B 7/18584* (2013.01); *H04W 4/50* (2018.02); *H04W 28/0975* (2020.05)

(58) Field of Classification Search
CPC ............ H04B 7/18586; H04B 7/18513; H04B 7/18584; H04B 7/18519; H04B 7/18515; H04B 7/1851; H04B 7/18521; H04W 4/50; H04W 28/0975; H04W 16/00; H04W 16/04; H04W 28/00; H04W 28/02; H04W 28/0925; H04W 28/16
USPC ...................... 455/12.1, 13.1–13.3, 427–431
See application file for complete search history.

(56) References Cited

U.S. PATENT DOCUMENTS

| | | | | |
|---|---|---|---|---|
| 5,905,943 | A * | 5/1999 | Wiedeman ......... | H04B 7/18532 455/11.1 |
| 9,819,742 | B1 * | 11/2017 | Coleman ............. | G06F 11/2041 |
| 2012/0191824 | A1 * | 7/2012 | Davis .................. | H04B 7/18513 709/220 |
| 2016/0094288 | A1 * | 3/2016 | Krebs ................. | H04B 7/18521 455/12.1 |
| 2017/0250751 | A1 * | 8/2017 | Kargieman ........ | G06K 9/00637 |
| 2020/0073742 | A1 * | 3/2020 | Arora ................. | G06K 9/00536 |
| 2020/0133746 | A1 * | 4/2020 | Cleave .................... | H04L 67/12 |

\* cited by examiner

*Primary Examiner* — Philip Sobutka (74) *Attorney, Agent, or Firm* — IP Attorneys Group, LLC (57) ABSTRACT

Disclosed is a method for deploying tasks in a satellite network. In the method for deploying tasks in a satellite network, a utility function is determined by constructing a task processing delay model and a traffic model; a fitness degree of each individual is determined according to the utility function, and an individual with a highest fitness degree is put into a next-generation population; a probability that each of the plurality of individuals is selected is determined according to the fitness degree; a crossover operation and a mutation operation are performed on the individual according to the probability, to obtain a crossover individual and a mutation individual respectively; an available crossover individual and an available mutation individual are put into a next-generation population, to perform a repeated iteration and complete population updating; an optimal task deployment location table is output; and satellite network task deployment is completed.

5 Claims, 6 Drawing Sheets

METHOD FOR DEPLOYING TASK IN SATELLITE NETWORK

TECHNICAL FIELD

The present disclosure relates to the satellite deployment field, and in particular, to a method for deploying tasks in a satellite network.

BACKGROUND

The ground network and satellite communications system will be integrated in the sixth-generation (6G) mobile communications system. Currently, the 6G has been applied in land, sea, air and even underwater space. In addition, with rapid development of such application as voice recognition, intelligent transportation, Internet of Things (IoT), it is a trend to provide a user with global access to a network and reliable service support anytime and anywhere.

A 6G communications era and a low earth orbit satellite network can provide a user with reliable communications and service support. In the satellite network, an ICN-based communication mode is used, a satellite node can cache data and perceive local cache content, and An SDN-based network architecture is used to globally control all types of network resources.

However, due to a dynamic topology of the satellite network and limited on-board resources, it is very difficult to deploy tasks in the satellite network for computing and processing.

SUMMARY

The present disclosure aims to provide a method for deploying tasks in a satellite network, to reduce a delay processing delay and traffic and system brought by task deployment while allowing a plurality of tasks to be deployed on a plurality of satellite nodes for processing.

To achieve the above purpose, the present disclosure provides the following technical solutions.

A method for deploying tasks in a satellite network includes:

obtaining a computation amount and a caching amount required by a user task;

constructing a task processing delay model according to the computation amount, where the task processing delay model includes a task deployment delay model, a task data transmission delay model, and a task computation delay model;

constructing a traffic model according to the caching amount;

determining a utility function according to the task processing delay model and the traffic model;

obtaining an initial population, where the initial population is an initial feasible solution set, the initial feasible solution set includes a plurality of individuals, the individual is a task deployment matrix, and the task deployment matrix includes a deployment location;

determining a fitness degree of each individual according to the utility function, and putting an individual with a highest fitness degree into a next-generation population;

determining, according to the fitness degree, a probability that each of the plurality of individuals is selected;

performing a crossover operation and a mutation operation on the individual according to the probability, to obtain a crossover individual and a mutation individual respectively, where the mutation operation is selecting a row in the individual, setting an element with a median value of 1 in the row to 0, and then setting a randomly selected element in the row to 1;

determining whether the crossover individual is an available crossover individual, to obtain a first determining result, where the available crossover individual is whether a computation amount and a caching amount of a satellite on a deployment location in the crossover individual are greater than the computation amount and the caching amount required by the user task;

determining whether the mutation individual is an available mutation individual, to obtain a second determining result, where the available mutation individual is whether a computation amount and a caching amount of a satellite on a deployment location in the mutation individual are greater than the computation amount and the caching amount required by the user task;

putting the crossover individual into a next-generation population if the first determining result is that the crossover individual is an available crossover individual; or otherwise, discarding the crossover individual;

putting the mutation individual into a next-generation population if the second result is that the mutation individual is an available mutation individual; or otherwise, selecting a new individual, performing a mutation operation on the new individual according to the probability, to obtain a new mutation individual, and then returning to the step of "determining whether the mutation individual is an available mutation individual, to obtain a second determining result";

returning to the step of "performing a crossover operation and a mutation operation on the individual according to the probability, to obtain a crossover individual and a mutation individual respectively", and outputting the next-generation population until a quantity of iterations meets a preset iteration value;

determining a fitness degree of each individual in the next-generation population according to the utility function, and outputting an individual with a highest fitness degree, where the individual with a highest fitness degree is an optimal task deployment location table; and completing satellite network task deployment according to the optimal task deployment location table.

Preferably, the constructing a task processing delay model according to the computation amount specifically includes:

obtaining a propagation speed of an electromagnetic wave in a vacuum and a function indicating that an inter-satellite distance changes with time;

determining the task deployment delay model according to the propagation speed of an electromagnetic wave in a vacuum and the function indicating that an inter-satellite distance changes with time;

obtaining a data amount of the user task and a rate of transmission between satellite nodes;

determining the task data transmission delay model according to the data amount of the user task and the rate of transmission between satellite nodes;

obtaining a clock frequency allocated to the user task;

determining the task computation delay model according to the computation amount required by the user task and the clock frequency; and constructing the task processing delay model according to the task deployment delay model, the task data transmission delay model, and the task computation delay model.

Preferably, after the obtaining a computation amount and a caching amount required by a user task, the method further includes:

determining whether a computation amount and a caching amount of a satellite node are greater than the computation amount and the caching amount of the user task; and if yes, performing the step of "constructing a task processing delay model according to the computation amount"; or if no, decomposing the user task into a plurality of subtasks, and using each subtask as a current user task to perform the step of "constructing a task processing delay model according to the computation amount".

Preferably, the constructing a traffic model according to the caching amount specifically includes:

obtaining a quantity of times of inter-satellite forwarding;

determining traffic of each subtask according to the caching amount and the quantity of times of inter-satellite forwarding; and constructing the traffic model according to the traffic of each subtask.

Preferably, the method for deploying tasks in a satellite network further includes: performing the crossover operation on two individuals selected according to the probability by using a roulette strategy, to obtain crossover individuals; where the two individuals are respectively a first individual and a second individual; and the crossover operation is exchanging any row in the first individual and a row that is in the second individual and that corresponds to the any row in the first individual.

According to specific embodiments of the present disclosure, the present disclosure has the following technical effects:

In the method for deploying tasks in a satellite network provided in the present disclosure, a utility function is determined by constructing a task processing delay model and a traffic model; a fitness degree of each individual is determined according to the utility function, and an individual with a highest fitness degree is put into a next-generation population; a probability that each of the plurality of individuals is selected is determined according to the fitness degree; a crossover operation and a mutation operation are performed on the individual according to the probability, to obtain a crossover individual and a mutation individual respectively; an available crossover individual and an available mutation individual are put into a next-generation population, to perform a repeated iteration and complete population updating; an optimal task deployment location table is output; and task deployment in the satellite network is completed according to the optimal task deployment location table. In this way, a plurality of tasks can be deployed on a plurality of satellite nodes for processing, and meanwhile, the delay processing delay and traffic caused by task deployment can be reduced.

BRIEF DESCRIPTION OF DRAWINGS

To describe the technical solutions in the embodiments of the present disclosure or in the prior art more clearly, the accompanying drawings required for describing the embodiments will be described briefly below. Apparently, the accompanying drawings in the following descriptions show some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The present disclosure aims to provide a method for deploying tasks in a satellite network, to reduce a delay processing delay and traffic brought by task deployment while allowing a plurality of tasks to be deployed on a plurality of satellite nodes for processing.

To make the foregoing objective, features, and advantages of the present disclosure clearer and more comprehensible, the present disclosure is further described in detail below with reference to the accompanying drawings and specific implementations.

Figure 1:
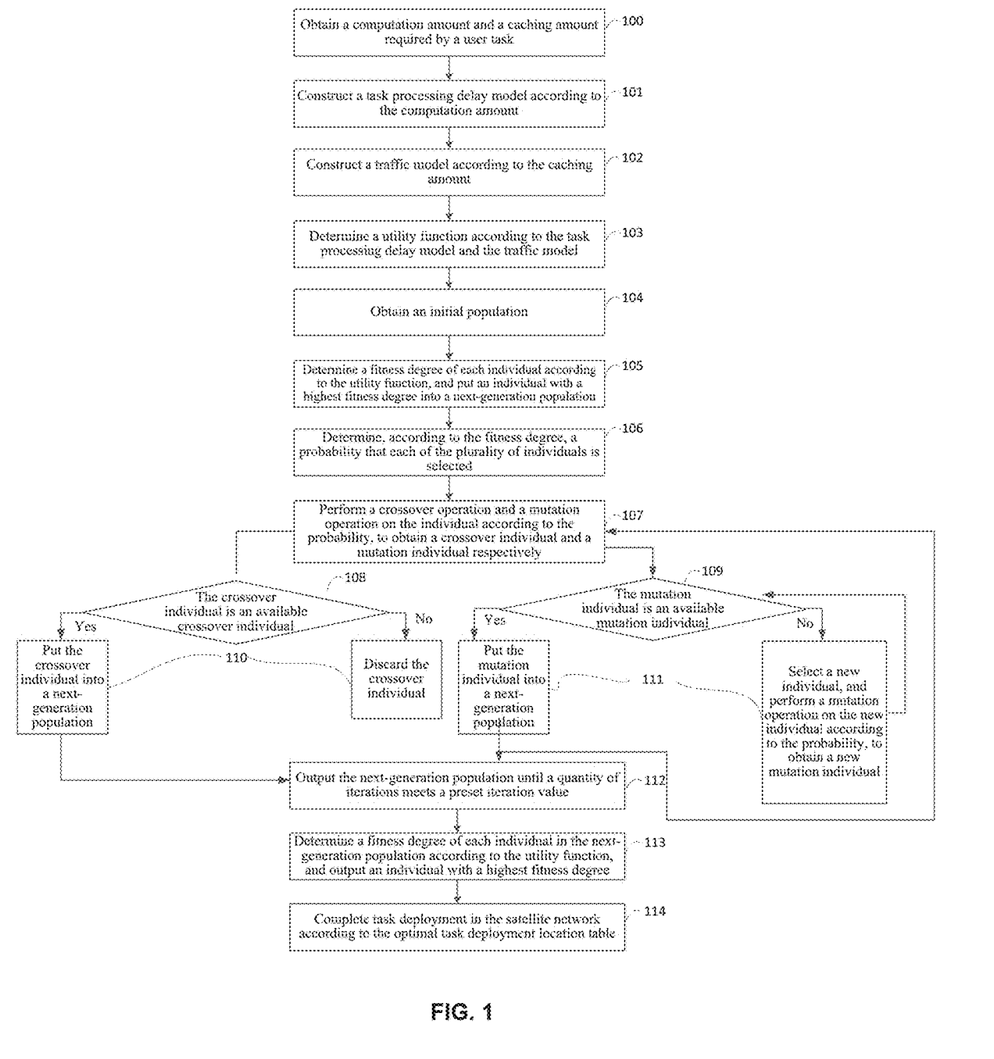
FIG. 1 is a flowchart of a method for deploying tasks in a satellite network according to the present disclosure.

FIG. 1 is a flowchart of a method for deploying tasks in a satellite network according to the present disclosure. As shown in FIG. 1, the method for deploying tasks in a satellite network includes:

Step 100: Obtain a computation amount and a caching amount required by a user task.

Step 101: Construct a task processing delay model according to the computation amount, where the task processing delay model includes a task deployment delay model, a task data transmission delay model, and a task computation delay model. The step may specifically include:

obtaining a propagation speed of an electromagnetic wave in a vacuum and a function indicating that an inter-satellite distance changes with time;

determining the task deployment delay model according to the propagation speed of an electromagnetic wave in a vacuum and the function indicating that an inter-satellite distance changes with time;

obtaining a data amount of the user task and a rate of transmission between satellite nodes;

determining the task data transmission delay model according to the data amount of the user task and the rate of transmission between satellite nodes;

obtaining a clock frequency allocated to the user task;

determining the task computation delay model according to the computation amount required by the user task and the clock frequency; and constructing the task processing delay model according the task deployment delay model, the task data transmission delay model, and the task computation delay model.

Step 102: Construct a traffic model according to the caching amount.

Step 103: Determine a utility function according to the task processing delay model and the traffic model.

Step 104: Obtain an initial population, where the initial population is an initial feasible solution set, the initial feasible solution set includes a plurality of individuals, the individual is a task deployment matrix, and the task deployment matrix includes a deployment location.

Step 105: Determine a fitness degree of each individual according to the utility function, and put an individual with a highest fitness degree into a next-generation population.

Step 106: Determine, according to the fitness degree, a probability that each of the plurality of individuals is selected.

Step 107: Perform a crossover operation and a mutation operation on the individual according to the probability, to obtain a crossover individual and a mutation individual respectively. The crossover operation is performed on two individuals selected according to the probability by using a roulette strategy, to obtain crossover individuals. The two individuals are respectively a first individual and a second individual. The crossover operation is exchanging any row in the first individual and a row that is in the second individual and that corresponds to the any row in the first individual. The mutation operation is selecting a row in the individual, setting an element with a median value of 1 in the row to 0, and then setting a randomly selected element in the row to 1.

Step 108: Determine whether the crossover individual is an available crossover individual, to obtain a first determining result, where the available crossover individual is whether a computation amount and a caching amount of a satellite on a deployment location in the crossover individual are greater than the computation amount and the caching amount required by the user task.

Step 109: Determine whether the mutation individual is an available mutation individual, to obtain a second determining result, where the available mutation individual is whether a computation amount and a caching amount of a satellite on a deployment location in the mutation individual are greater than the computation amount and the caching amount required by the user task.

Step 110: Put the crossover individual into a next-generation population if the first determining result is that the crossover individual is an available crossover individual; or otherwise, discard the crossover individual.

Step 111: Put the mutation individual into a next-generation population if the second result is that the mutation individual is an available mutation individual; or otherwise, select a new individual, perform a mutation operation on the new individual according to the probability, to obtain a new mutation individual, and then return to the step of "determining whether the mutation individual is an available mutation individual, to obtain a second determining result".

Step 112: Return to the step of "performing a crossover operation and a mutation operation on the individual according to the probability, to obtain a crossover individual and a mutation individual respectively", and output the next-generation population until a quantity of iterations meets a preset iteration value.

Step 113: Determine a fitness degree of each individual in the next-generation population according to the utility function, and output an individual with a highest fitness degree, where the individual with a highest fitness degree is an optimal task deployment location table.

Step 114: Complete task deployment in the satellite network according to the optimal task deployment location table.

In a preferred implementation of the present disclosure, to improve task deployment efficiency, after obtaining a computation amount and a caching amount required by a user task, the following operations may be further included:

determining whether a computation amount and a caching amount of a satellite node are greater than the computation amount and the caching amount of the user task; and if yes, performing the step of "constructing a task processing delay model according to the computation amount"; or if no, decomposing the user task into a plurality of subtasks, and using each subtask as a current user task to perform the step of "constructing a task processing delay model according to the computation amount".

Based on this, the constructing a traffic model according to the caching amount in the present disclosure may specifically include the following steps:

obtaining a quantity of times of inter-satellite forwarding;

determining traffic of each subtask according to the caching amount and the quantity of times of inter-satellite forwarding; and constructing the traffic model according to the traffic of each subtask.

The following provides a specific implementation example to further illustrate the solutions of the present disclosure. The specific implementation example in the present disclosure is described by using an example of constructing an SDN-based and ICN-based satellite network. In specific application, the solutions of the present disclosure are also applicable to construction of another satellite network.

A model of on-board resources of a low earth orbit satellite and a task deployment problem is constructed, and a satellite network task deployment problem is resolved according to a genetic algorithm. In this method, in an SDN (Software Defined Network)-based double-layered satellite network architecture, a satellite at an LEO (Low Earth Orbit) layer is a forwarding layer in the architecture, and deployment locations at which the task is computed are a constellation including low orbit satellites. A satellite node in an ICN (Information-Centric Networking)-based communication mode has a capability of perceiving information. The node supports caching function. A constellation including three satellites in a GEO (Geostationary Orbit) is an SDN control layer, and completes computation for task deployment and a task of managing and controlling a low earth orbit. In the SDN-based satellite network architecture, the LEO satellite node can quantize computation, caching, and communications resources of the LEO satellite node, and upload a current resource status to an SDN controller.

Figure 2:
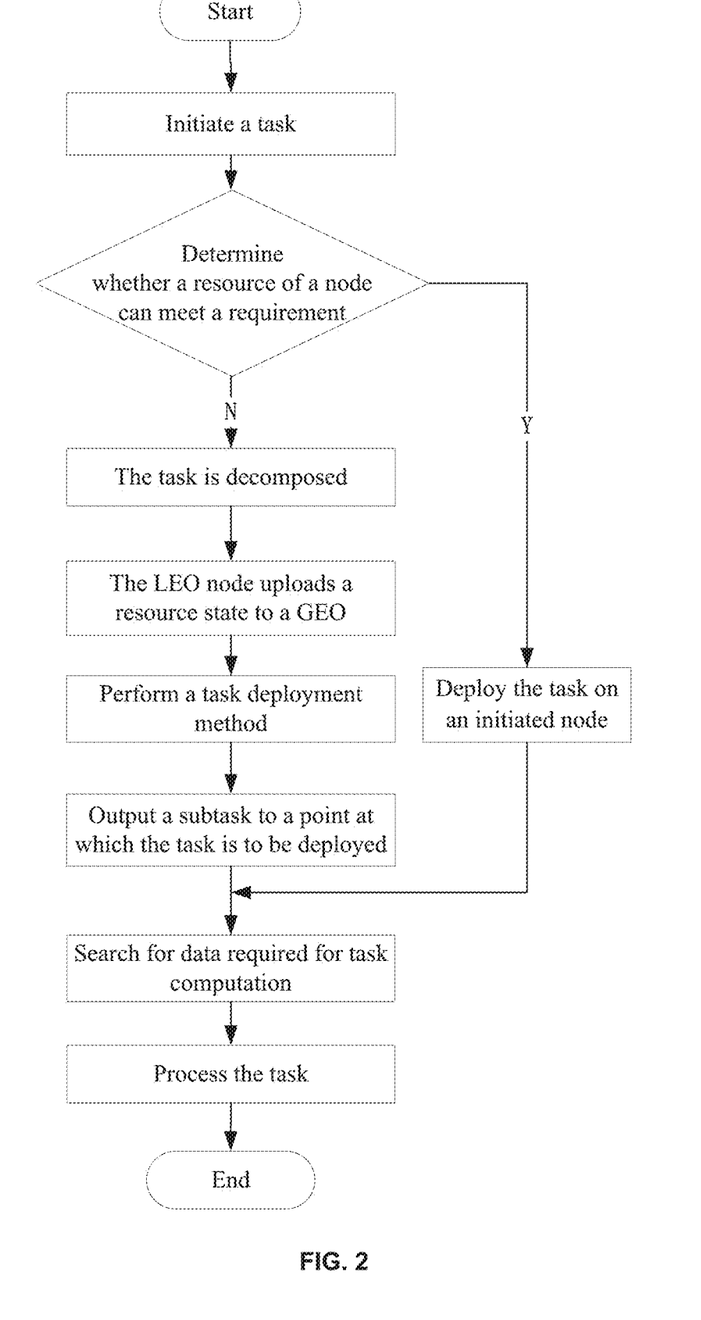
FIG. 2 is a flowchart of performing a method for deploying tasks in a satellite network provided in the present disclosure according to an embodiment of the present disclosure.

Based on this idea, a specific process of performing a method for deploying tasks in a satellite network is shown in FIG. 2, and includes the following steps.

Step 1: An LEO satellite node receives a task request of an access user, and adds a task to a GEO task processing queue.

Step 2: The LEO satellite node decomposes the task into subtasks with a smaller amount of resources, and a GEO satellite collects information such as a remaining computation amount, remaining cache space, a link status, and the like of each LEO satellite node.

Step 3: Perform the method for deploying tasks in a satellite network, and generate an optimal task deployment location table.

Step 4: Send the task deployment location table computed by the GEO satellite to the LEO satellite node initiated by the task.

Step 5: The satellite initiated by the task sends the subtasks to a node on which the task is to be deployed, where the node on which the task is to be deployed searches data required for task processing by using a name-based communication mode.

Step 6: After completing subtask processing, at the node on which the task is to be deployed returns processed subtasks to the satellite initiated by the task, and the satellite initiated by the task completes result integration.

The method for deploying tasks in a satellite network provided in the present disclosure is used in step 3. A specific implementation process in this embodiment is:

constructing models of on-board resources of a low earth orbit satellite and a task deployment problem, including a traffic model and a task processing delay model.

1. Construct a Traffic Model

A triplet $T_n(C_n,R_n,G)$ is used to represent resource consumption of each task. Herein, $C_n$ represents a computation amount required by a task n, $R_n$ represents a cache space capacity required by the task n, and G represents an association relationship obtained after the task is decomposed.

Data required by subtasks $T_n(C_n,R_n,G)$ needs to be obtained from j satellite nodes. The satellites can respectively provide $R_1, R_2, \ldots,$ and $R_j$ resources. Forwarding needs to be performed separately for $k_1, k_2, \ldots,$ and $k_j$ times from nodes providing resources to the node on which the task is to be deployed.

A formula of traffic $F_j$ for completing transmission of a single subtask is as follows:

$$F_j = \sum_{i=1}^{j} k_i R_i = k_1 R_1 + k_2 R_2 + \ldots + k_j R_j.$$

A formula of traffic $F_n$ brought by completing resource transmission of tasks including n subtasks is as follows:

$$F_n = \sum_{j=1}^{n} F_j.$$

2. Task Processing Delay Model
(1) Task Deployment Delay Model
A formula of a communication delay is as follows:

$$t_d = \frac{D(t)}{c}.$$

Herein, D(t) is a function indicating that an inter-satellite distance changes with time, and may be generated according to a constellation operation rule. c is a propagation speed of an electromagnetic wave in a vacuum.

Signal-transmission delays are separately $t_{d1}, t_{d2}, \ldots,$ and $t_{dn}$. A single-subtask deployment delay $t_b$ is as follows:

$$t_b = t_{d1} + t_{d2} + \ldots + t_{dn}.$$

The task includes n subtasks, and signal-subtask deployment delays are separately $t_{b1}, t_{b2}, \ldots,$ and $t_{bn}$. A task deployment delay $T_n^1$ is as follows:

(2) Task Data Transmission Delay Model

A plurality of satellites need to perform forwarding to transmit data required by the task to the node on which the task is to be deployed. In addition, communication bandwidths between any two satellites are different. Therefore, independent computation on the transmission delay needs to be performed. Herein, $M=\{m_1, m_2 \ldots m_n\}$ is a set of numbers of all satellites in a network. A transmission rate between satellites whose numbers are m and n is $r_m^n$. A delay of completing a transmission of data whose amount is $R^m$ is as follows:

$$T_m^n = \frac{R^m}{r_m^n} \forall\, m, n \in M.$$

Delays required for completing all transmissions are separately $T_1, T_2, \ldots,$ and $T_n$. A communication delay of k times of forwarding is as follows:

$$T_k = T_1 + T_2 + \ldots + T_k.$$

Because the transmissions are synchronously performed, the transmission delay is a longest subtask transmission time. Assuming that single subtasks are respectively forwarded for $k_1, k_2, \ldots,$ and $k_n$ times, the transmission delay is as follows:

$$T_n^2 = \max\{T_{k_1}, T_{k_2}, \ldots T_k^n\}.$$

(3) Task Computation Delay Model

Herein, $F_m$ is a clock frequency of the LEO satellite, and $f_m$ is a clock frequency assigned to the subtask. Therefore, a delay required for completing computation of the subtask $T_n(C_n,R_n,G)$ is as follows:

$$t_l = \frac{C_n}{f_m}, \quad f_m \leq F_m.$$

A task computation delay includes an intra-queue waiting delay and a delay required for task computation. The waiting delay $t_w$ is a period of time used by a satellite node to complete current computation of an intra-queue task, is computed by the satellite node, and is uploaded to an SDN control node. The computation delay is as follows:

$$T_n^3 = t_w + t_l.$$

A task processing delay includes a task deployment delay, a transmission delay of data required by the task, and a task computation delay. A total task processing delay is expressed as follows:

$$T_n = T_n^1 + T_n^2 + T_n^3 = \max\{t_{b1}, t_{b2} \ldots t_{bn}\} + \max\{T_{k_1}, T_{k_2} \ldots T_{k_n}\} + t_w + t_l.$$

A utility function established for combined computation of the brought traffic and the task response delay is as follows:

$$Q_n = \alpha T_n + \beta F_n.$$

Herein, $\alpha, \beta \in [0,1]$, $\alpha + \beta = 1$, and $\alpha$ and $\beta$ are an equilibrium coefficient between the task processing delay and the task traffic.

A process of resolving the task deployment method according to the genetic algorithm is as follows:

1. Encoding: An m×n task deployment matrix is used to represent an individual, that is, a feasible solution to a problem. Herein, m is a quantity of satellites that can provide computation and caching resources when a decision is to be made, and n is a quantity of subtasks into which a current task is decomposed. The individual (feasible solution) is as follows:

$$A = \begin{bmatrix} a_{1m_a} & a_{1m_b} & \cdots & a_{1m_m} \\ a_{2m_a} & a_{2m_b} & \cdots & a_{2m_m} \\ \vdots & \vdots & \ddots & \vdots \\ a_{nm_a} & a_{nm_b} & \cdots & a_{nm_m} \end{bmatrix}.$$

Each element in the individual is a binary value of 0/1, $a_{min_a}=1$ represents that a subtask whose task number is m is deployed on a satellite node whose number is $m_a$. Each subtask needs a different computation amount and a different caching amount. Therefore, after an individual (feasible solution) is randomly generated, whether a node at a node on which the task is to be deployed can meet a requirement of a task for a computation amount and a caching amount needs to be detected (a computation amount and a caching amount of a satellite located at the node on which the task is to be deployed need to be greater than the computation amount and the caching amount required by the task). An individual that cannot meet the requirement is removed.

A set is used to represent a population. A quantity of individuals in an initial population is set to N. That is, a feasible solution set includes N individuals.

2. Selection: A feasible solution is selected from the feasible solution set for a crossover operation.

Fitness degrees of all individuals in the population are first computed. That is, a fitness degree function is used to evaluate the individuals.

A weight of the equilibrium coefficients α,β is first set according to the type of task, and this parameter is set manually.

Fitness degrees of individuals in each generation of population are computed by using the utility function as a fitness degree standard of the individuals.

$$Fit(A) = \frac{1}{Q_n} = \frac{1}{\alpha T_n + \beta F_n}.$$

The crossover operation is performed on two individuals selected according to a selection probability.

The probability that an individual is selected depends on the following method:

To ensure that an individual with a highest fitness degree in each generation can be maintained in a next generation, the individual with the highest fitness degree in each generation is first copied into the next generation. Then crossover is performed on two individuals selected according to the probability P(A) by using a roulette idea. An individual generated after the crossover is put into the next-generation population.

A roulette strategy is used to represent a probability that an individual is selected. That is, an individual with a higher fitness degree has a higher probability that the individual is selected. The probability that the individual is selected may be represented as follows:

$$P(A) = \frac{Fit_j(A)}{\sum_{i=1}^{N} Fit_i(A)}, \forall j \in N.$$

3. Crossover: An individual in the population is represented by a task deployment matrix, and an exchange between rows in the matrix is used to represent the crossover operation performed on the individuals. Each row in the task deployment matrix represents a deployment location of a single subtask, and two new individuals can be generated through the exchange between rows in the matrix.

4. Mutation: One individual is selected from the population according to the probability, to perform the mutation operation. A probability that an individual is mutated is set to p=0.01. The mutation operation is selecting a row in the individual matrix, setting an element with a median value of 1 in the row to 0, and then setting a randomly selected element in the row to 1. Availability of the mutated individual was detected after each time of mutation. That is, whether a computation amount and a caching amount at a deployment location can meet the requirement is determined. If the mutated individual is available, the individual is inserted into the next-generation population; or if the muted individual is not available, the mutation step is repeated, to continue to generate a new individual until a generated individual is available.

Only an initial feasible solution set is generated through encoding. Selection, crossover, and mutation are a cycle process of iteration. After the iteration is completed, a feasible solution with a highest fitness degree is output.

In conclusion, in the SDN-based satellite network architecture, the SDN controller is deployed on the GEO satellite. The LEO satellite node can perceive local cache content, update a cache, and upload the cache content to an SDN node in a timely manner. Data required by the subtasks is globally searched for by the SDN controller. The SDN controller implements deployment of the subtasks based on a case in which the SDN controller globally perceives a resource status.

When the task is initiated, whether resources of a current initiated node can meet a requirement of a user task. If the resources meet the requirement, the data required by the task is directly searched for, to complete task processing. If the resources of the current node cannot meet a user requirement, a task processing request is sent to the GEO-layer satellite. Based on a task decomposition relationship and the current resources of the LEO-layer satellite, the GEO satellite performs the task deployment method and deploys a subtask at a node on which the task is to be deployed. Each point at which the subtask is to be deployed searches for data required for computation and completes the task processing.

Based on the above solution, experimental parameters of an algorithm are set as follows:

A processing speed of a processor of the LEO satellite node is set to $1\times10^3$ MIPS. A processing speed of a ground computation center is $1\times10^8$ MIPS. An available capacity of an on-board caching space is randomly set to 20 MB to 100 MB. A computation amount of the task is set to $2\times10^4$ MI to $6\times10^4$ MI. An amount of input data of the task is from 20 MB to 50 MB. Each task is decomposed into a maximum of five dependent subtasks. A maximum inter-satellite link bandwidth is set to 100 Mbps, and a satellite-ground uplink bandwidth and a satellite-ground downlink bandwidth are 200 Mbps. In addition to providing an edge service, a satellite network also need to maintain a normal communications service. Therefore, an actual resource availability rate is evenly distributed between 0 and 100%. A quantity of populations in the genetic algorithm is 100, a quantity of iteration is 200, a crossover probability is 0.7, a mutation probability is 0.01, and a generation gap is set to 0.95.

Figure 3:
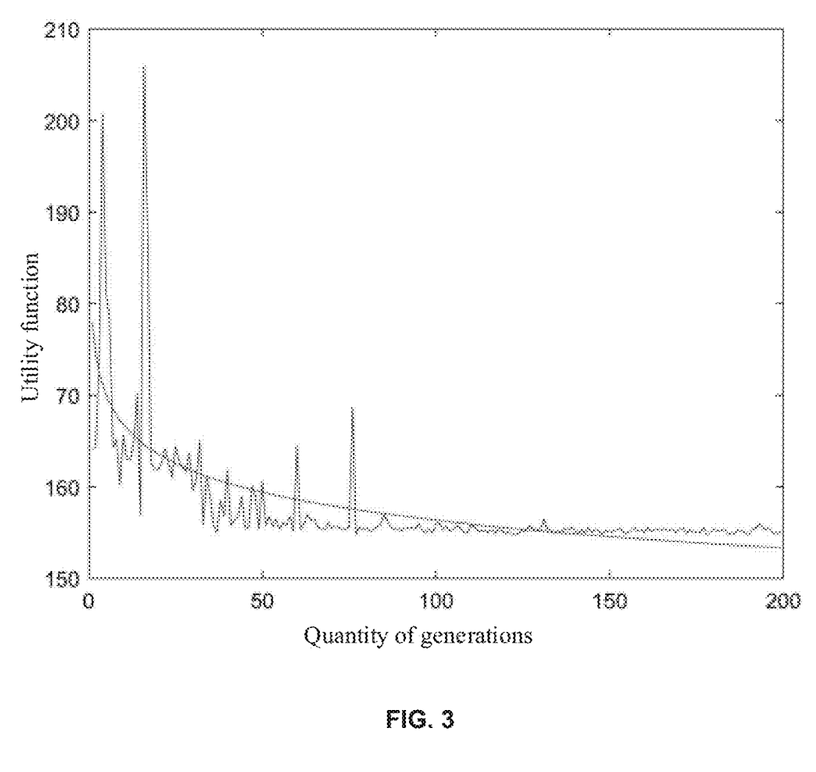
FIG. 3 is a diagram of a change in a utility function in an iteration process according to an embodiment of the present disclosure.

FIG. 3 shows algorithm convergence when a genetic algorithm is used to process task deployment in the satellite network in a random network state. As a quantity of iterations increases, a value of the utility function decreases. That is, a fitness degree of an individual gradually increases, and gradually converges after iteration is performed on the 100 generations.

Figure 4:
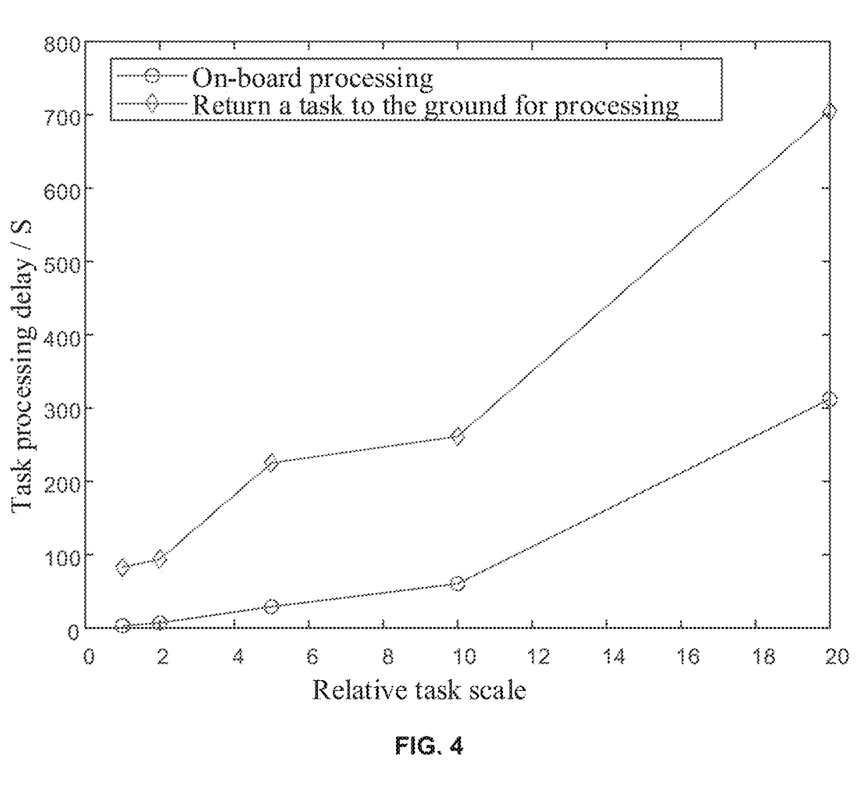
FIG. 4 is a diagram of a comparison between a satellite task processing delay and a ground task processing delay according to an embodiment of the present disclosure.

FIG. 4 is a diagram of a comparison between a satellite task processing delay and a ground task processing delay. The task processing delays when different scales of tasks are respectively deployed in an LEO satellite network and a cloud computing center are tested. In comparison with a case of sending a request task to a ground computing center for processing, a processing delay of the task can be reduced significantly in a case of deploying the task on the satellite for processing.

Figure 5:
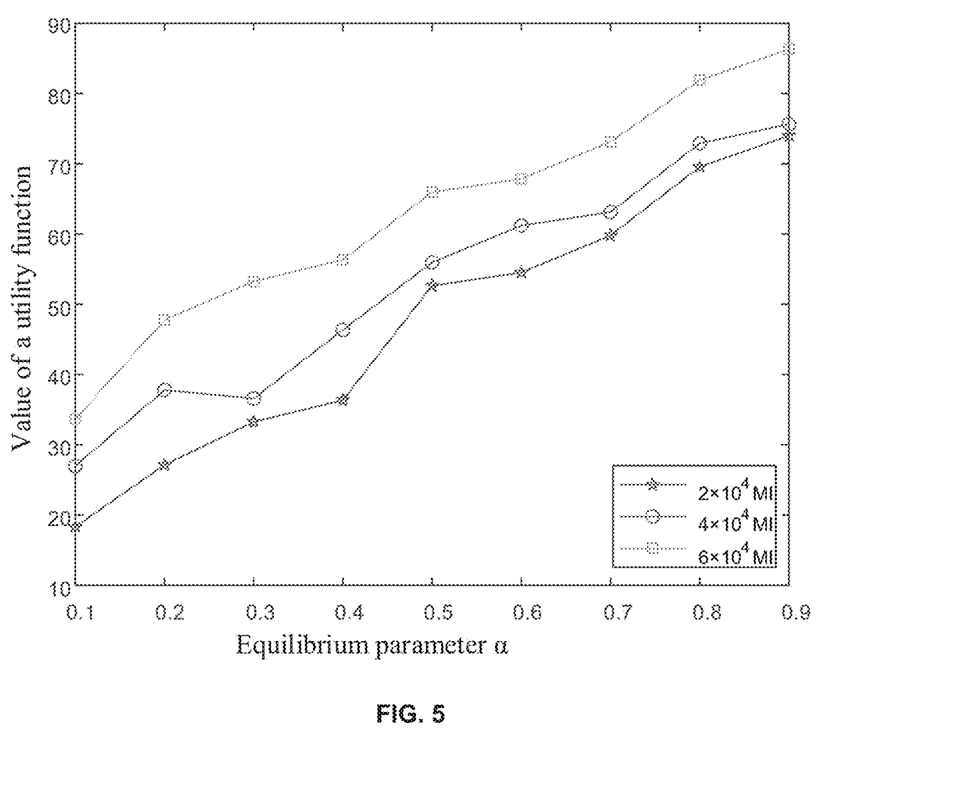
FIG. 5 is a diagram showing that a value of a utility function changes with an equilibrium parameter according to an embodiment of the present disclosure.

FIG. 5 is a diagram showing that a value of a utility function changes with an equilibrium parameter. According to features of main aspects of resource consumption, tasks are divided into a computing intensive task and a resource intensive task. An equilibrium parameter is added to the utility function, to equilibrate a relationship between the computing-intensive task and the resource-intensive task. FIG. 4 shows a relationship in which the utility function changes with an equilibrium parameter $\alpha$. A value of the utility function constantly increases with the parameter $\alpha$. Increasing the parameter $\alpha$ represents that a proportion of a delay to task processing is increased. This comparison shows impact of the equilibrium parameter on the utility function Increasing a computation amount of the task significantly increases the value of the utility function.

Figure 6:
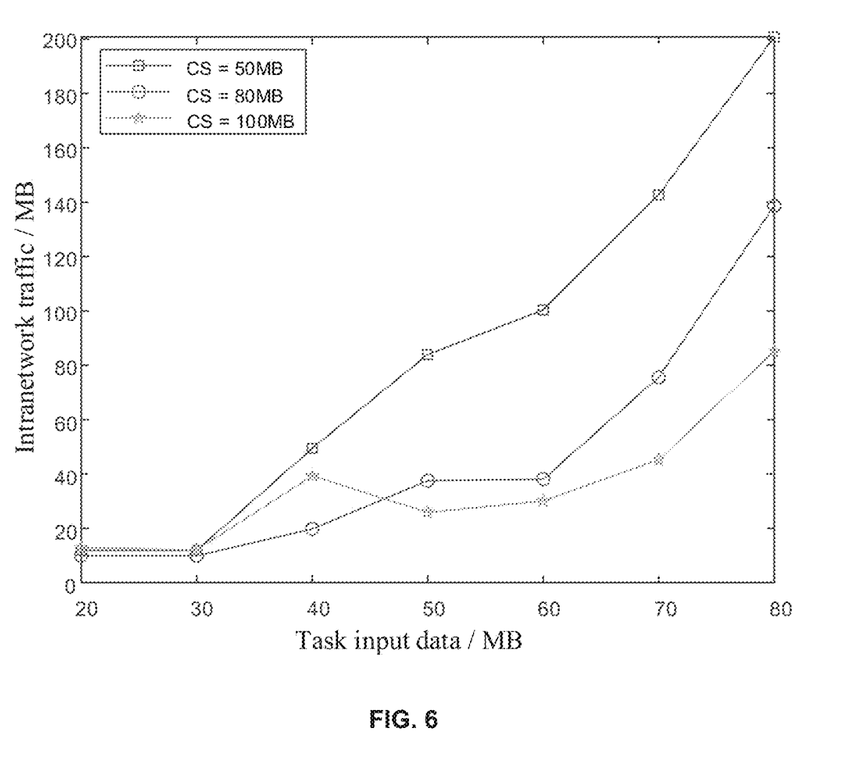
FIG. 6 is a relationship diagram showing that network traffic changes with an amount of the task input data according to an embodiment of the present disclosure.

FIG. 6 is a relationship diagram showing that network traffic changes with an amount of the task input data in the network. In an experiment, a task computation amount is set to remain unchanged, and a data amount required for task processing is changed. It can be seen that the network traffic constantly increases with an amount of the task input data. When an on-board cache capacity can accommodate data required for task processing, traffic can be kept at a relatively low level. In addition, an increasing amount of task input data significantly increases the network traffic.

In this specification, specific examples are used to describe the principles and implementations of the present disclosure. The description of the foregoing embodiments is used to help illustrate the method of the present disclosure and the core idea thereof. In addition, a person of ordinary skill in the art can make various modifications in terms of specific implementations and scope of application in accordance with the ideas of the present disclosure. In conclusion, the content of this specification shall not be construed as a limitation to the present disclosure.

What is claimed is:

1. A method for deploying tasks in a satellite network, comprising:
    obtaining a computation amount and a caching amount required by a user task;
    constructing a task processing delay model according to the computation amount, wherein the task processing delay model comprises a task deployment delay model, a task data transmission delay model, and a task computation delay model;
    constructing a traffic model according to the caching amount;
    determining a utility function according to the task processing delay model and the traffic model;
    obtaining an initial population, wherein the initial population is an initial feasible solution set, the initial feasible solution set comprises a plurality of individuals, the individual is a task deployment matrix, and the task deployment matrix comprises a deployment location;
    determining a fitness degree of each individual according to the utility function, and putting an individual with a highest fitness degree into a next-generation population;
    determining, according to the fitness degree, a probability that each of the plurality of individuals is selected;
    performing a crossover operation and a mutation operation on the individual according to the probability, to obtain a crossover individual and a mutation individual respectively, wherein the mutation operation is selecting a row in the individual, setting an element with a median value of 1 in the row to 0, and then setting a randomly selected element in the row to 1;
    determining whether the crossover individual is an available crossover individual, to obtain a first determining result, wherein the available crossover individual is whether a computation amount and a caching amount of a satellite on a deployment location in the crossover individual are greater than the computation amount and the caching amount required by the user task;
    determining whether the mutation individual is an available mutation individual, to obtain a second determining result, wherein the available mutation individual is whether a computation amount and a caching amount of a satellite on a deployment location in the mutation individual are greater than the computation amount and the caching amount required by the user task;
    putting the crossover individual into a next-generation population if the first determining result is that the crossover individual is an available crossover individual; or otherwise, discarding the crossover individual;
    putting the mutation individual into a next-generation population if the second result is that the mutation individual is an available mutation individual; or otherwise, selecting a new individual, performing a mutation operation on the new individual according to the probability, to obtain a new mutation individual, and then returning to the step of "determining whether the mutation individual is an available mutation individual, to obtain a second determining result";
    returning to the step of "performing a crossover operation and a mutation operation on the individual according to the probability, to obtain a crossover individual and a mutation individual respectively", and outputting the next-generation population until a quantity of iterations meets a preset iteration value;
    determining a fitness degree of each individual in the next-generation population according to the utility function, and outputting an individual with a highest fitness degree, wherein the individual with a highest fitness degree is an optimal task deployment location table; and
    completing satellite network task deployment according to the optimal task deployment location table.

2. The method for deploying tasks in a satellite network according to claim 1, wherein the constructing a task processing delay model according to the computation amount specifically comprises:
    obtaining a propagation speed of an electromagnetic wave in a vacuum and a function indicating that an inter-satellite distance changes with time;
    determining the task deployment delay model according to the propagation speed of an electromagnetic wave in a vacuum and the function indicating that an inter-satellite distance changes with time;

obtaining a data amount of the user task and a rate of transmission between satellite nodes;

determining the task data transmission delay model according to the data amount of the user task and the rate of transmission between satellite nodes;

obtaining a clock frequency allocated to the user task;

determining the task computation delay model according to the computation amount required by the user task and the clock frequency; and constructing the task processing delay model according to the task deployment delay model, the task data transmission delay model, and the task computation delay model.

3. The method for deploying tasks in a satellite network according to claim 1, wherein after the obtaining a computation amount and a caching amount required by a user task, the method further comprises:

determining whether a computation amount and a caching amount of a satellite node are greater than the computation amount and the caching amount of the user task; and if yes, performing the step of "constructing a task processing delay model according to the computation amount"; or if no, decomposing the user task into a plurality of subtasks, and using each subtask as a current user task to perform the step of "constructing a task processing delay model according to the computation amount".

4. The method for deploying tasks in a satellite network according to claim 3, wherein the constructing a traffic model according to the caching amount specifically comprises:

obtaining a quantity of times of inter-satellite forwarding;

determining traffic of each subtask according to the caching amount and the quantity of times of inter-satellite forwarding; and constructing the traffic model according to the traffic of each subtask.

5. The method for deploying tasks in a satellite network according to claim 1, comprising: performing the crossover operation on two individuals selected according to the probability by using a roulette strategy, to obtain crossover individuals; wherein the two individuals are respectively a first individual and a second individual; and the crossover operation is exchanging any row in the first individual and a row that is in the second individual and that corresponds to the any row in the first individual.

* * * * *